United States Patent [19]
Lusk

[11] 3,796,821
[45] Mar. 12, 1974

[54] HIGH VOLTAGE CABLE TERMINATION

[75] Inventor: George E. Lusk, Downers Grove, Ill.

[73] Assignee: G & W Electric Specialty Company, Blue Island, Ill.

[22] Filed: Oct. 6, 1972

[21] Appl. No.: 295,507

[52] U.S. Cl. .......................... 174/73 R, 174/75 D
[51] Int. Cl. ....................................... H02g 15/02
[58] Field of Search ............ 174/19, 20, 73 R, 73 S, 174/74 R, 75 R, 75 D, 75 F, 78, 80, 142; 85/1 C; 339/265 R, 265 F, 272 R

[56] References Cited
UNITED STATES PATENTS

| | | | |
|---|---|---|---|
| 2,728,810 | 12/1955 | Ziehr | 174/75 R |
| 3,290,428 | 12/1966 | Yonkers | 174/73 R |
| 3,355,541 | 11/1967 | Hornberger | 174/73 R |
| 3,404,211 | 10/1968 | Nicholson | 174/73 R X |
| 3,494,243 | 2/1970 | Kleinhenn | 85/1 C |
| 3,548,070 | 12/1970 | Duenke | 174/73 R X |
| 3,585,274 | 6/1971 | Tomaszewski et al. | 174/73 R |
| 3,634,604 | 1/1972 | Lusk | 174/73 R |
| 3,662,082 | 5/1972 | Heppner | 174/73 R X |
| 3,715,449 | 2/1973 | Cunningham et al. | 174/73 R X |

OTHER PUBLICATIONS
Anderson Electric Corp. Manufacturer's Catalog, No. 57, Section "B", page 34–B, Oct. 1, 1957,

*Primary Examiner*—Laramie E. Askin
*Attorney, Agent, or Firm*—Fitch, Even, Tabin & Luedeka

[57] ABSTRACT

A cable termination is provided with a terminator having a rigid insulator suited for outdoor application and an inner stress relief element contained in the insulator. The terminator is applied in telescopic relation to a prepared end of a power cable which has a region of high electrical stress. The inner stress relief element includes a compressible portion having electrically conductive properties and forming a stress control shield, and a contiguous high dielectric strength portion. The two portions are related to one another such that the compressible portion provides continuous compliance of the stress relief element on the prepared cable end of any solid plastic or elastomeric insulated cable that is within a given range of cable sizes. The terminator may include a sealable compression lug for the making of an external electrical connection to the terminator.

21 Claims, 10 Drawing Figures

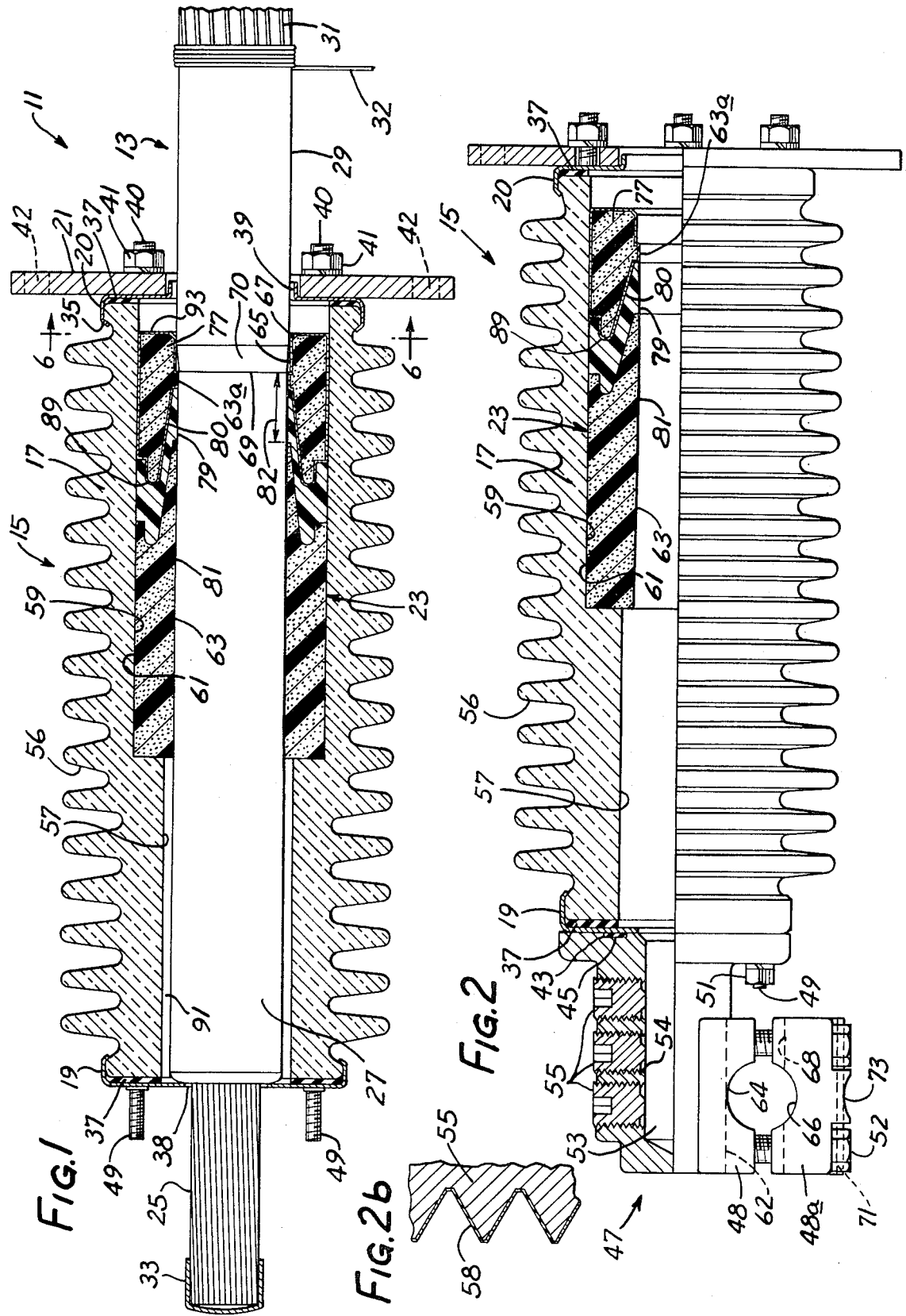

HIGH VOLTAGE CABLE TERMINATION

The present invention relates to high voltage cable terminations, and more particularly to terminators and the stress control elements that are used to fill the space between the terminator insulators and their respective cables.

The term "terminator" has been commonly used in industry interchangeably with cable termination, terminal or pothead. The term "cable termination" is used throughout this application to cover the complete assembly of a cable, riser, support structure, etc., as it is when ready for service. The term terminator or "pothead" is used to refer to the device and materials normally supplied by a manufacturer to terminate a cable in the field. An Institute of Electrical and Electronic Engineers (IEEE) publication 48 "Standard For Potheads," issued May, 1962, generally covers the terminology for these devices.

As used herein, the term "high voltage" refers to a rating of at least 15,000 volts (15 kv). Cables having such a voltage rating generally contain an electrically conductive layer (shielding) over the dielectric insulation layer. This shield layer generally consists of a carbon filled plastic or elastomer directly extruded over the insulation proper. Metal wires or tapes may be wound in a helical form concentrically around the cables on the shield layer to enhance the current carrying capacity of the shield system. The shield system is grounded. The potential of the conductor within the cable may be considered at one hundred percent of the operating voltage of the system; and the potential of the grounded shield at zero. The voltage gradient, i.e., the difference in potential per unit thickness of the insulating medium, between the conductor and the shield may be represented by an infinite number of concentric cylindrical surfaces within the cable insulation, each surface being of the same voltage potential. In a longitudinal section, these cylindrical surfaces would then be seen as equipotential lines. The voltage gradient represented by the lines is the greatest close to the conductor and the least away from the conductor.

When a power cable is terminated, such as for making a connection to electrical equipment, the conductor is exposed by removing some lengths of both the insulation and the shield layer. The shield layer is removed from a length of insulation so as to separate the exposed conductor and the grounded shield and thus provide adequate creepage distance from the live conductor to ground; i.e., the end of the grounded shield, which is at zero potential, is separated from the exposed conductor, which is at one hundred percent potential. This separation is made by a distance adequate to avoid flash over on the surface of the insulation therebetween.

Such a termination creates an abrupt discontinuity in the electrical characteristics of the cable. Further, it exposes the cable insulation to ambient atmosphere, which contains moisture, gases, and particulate matter. The baring of the conductor exposes it to corrosion, and the discontinuing of the cable shield materially increases the maximum voltage gradient (volts/mil) of the insulation in the area of the cable shield end and immediately changes the shape of the resulting electrical field to introduce high longitudinal voltage gradients along the surface of the insulation adjacent the cable shield end. Thus, the maximum voltage gradient is shifted from a radial stress, which diminishes outwardly from the conductor, to a longitudinal stress at the end of the cable shield layer. The nature of the cable insulation is such that it more readily withstands the stress in the radial direction than along a longitudinal surface or interface, and risk of breakdown is therefore greater in the longitudinal direction.

One purpose of a terminator in a cable termination is to compensate for this shift in the electrical field and electrical stress characteristics at the cable terminal. Another purpose is to protect the cable end portions from the effects of ambient elements.

Terminators may be of the so-called "wet" type or of the so-called "dry" type. They generally include a rigid insulator shell or body which electrically insulates and protects the cable termination against the effects of wind, precipitation, ultraviolet radiation, and air-borne contamination.

Typically in the wet type, the insulator body contains, for example, a stress control shield applied at the termination of the cable shield layer and a suitable dielectric compound or fluid that fills the space or cavity between the cable and the inside wall of the insulator body. The stress control shield may be of metal or of hand-applied electrically conductive tape that is built up in a suitable form.

Typically in the "dry" type, the insulator body contains, for example, a molded stress relief element of a noncompressible elastomer which has an inside diameter that provides an interference fit on the insulation surface of a specific size of cable. In such instance, the material of the molded stress relief element is also the dielectric medium that fills the aforementioned space or cavity. Where dielectric strength is needed, the space is filled with a dielectric material to exclude air, which is generally not suitable for such a medium.

Some disadvantages attend the foregoing terminators when used on the extruded insulation cables. For example, the use of a dielectric compound or fluid in the terminators is inconvenient to handle in the field, and further, the compound may be workable only at certain temperatures; the hand applied stress control shield involves both skill in construction and considerable time in installation; and the noncompressible molded stress relief element usually requires a relatively high force to slide it over the cable end because of the interference fit, and it is suitable for application only to a given nominal size of cable. Even here a difficulty may be encountered because of the variation in diameter during a cable run as well as between runs in manufacturing and a particular noncompressible element may not provide an interference fit on all cable segments of a given nominal size of cable.

U.S. Pat. No. 3,634,604 issued Jan. 11, 1972 to George E. Lusk, discloses an improved power cable terminator employing a dry type, molded stress relief element made of a compressible dielectric material. A given stress relief element of the type disclosed is capable of accommodating a range of cable diameters. The present invention is an improvement of the type of cable termination therein disclosed, especially for use in higher rated voltage systems than therein contemplated.

It is an object of the present invention to provide an improved terminator for high voltage extruded insulated cable terminations.

It is another object of the present invention to provide an improved terminator and an inner stress relief element therefor that is capable of accommodating a range of power cable diameters for a given element size in a high voltage system.

It is yet another object of the present invention to provide a dry type high voltage terminator that is capable of being easily installed in the field.

These and other objects of the invention are more particularly set forth in the following detailed description and in the accompanying drawings of which:

FIG. 1 is a side view in section of a cable termination embodying various features of the present invention;

FIG. 2 is a side elevational view partly in section of a high voltage terminator for use in the termination of FIG. 1 and further including a sealable compression connector at the hood end of the terminator;

FIG. 2b is a fragmentary view of a portion of a sealable set screw of the sealable compression lug of FIG. 2 with dimensions exaggerated for clarity of illustration;

Figure 2A:
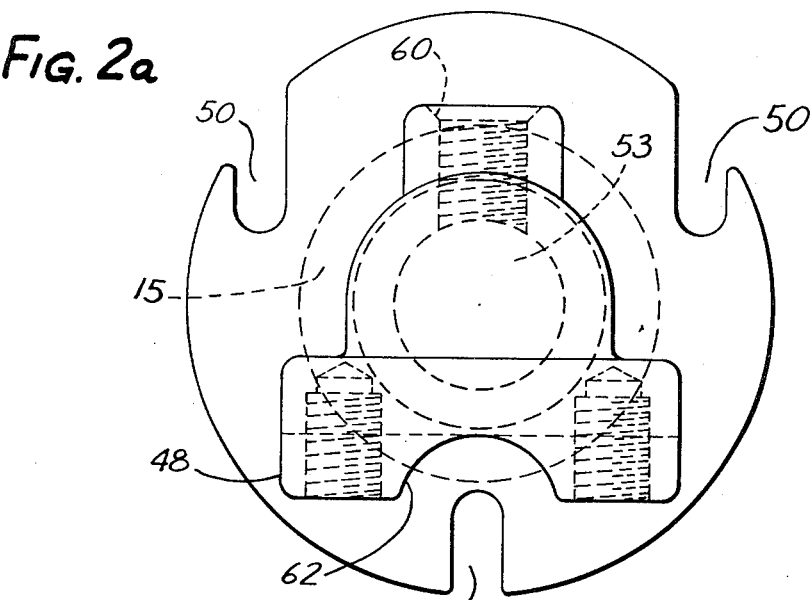
FIG. 2a is an end view of the sealable compression connector of FIG. 2.

Referring now to FIG. 1, the reference numeral 11 refers generally to a high voltage cable termination in accordance with a preferred embodiment of the present invention.

Very generally, the end of a high voltage power cable 13 has a terminator 15 applied thereon in telescopic relation. The terminator 15 includes a rigid insulator body or housing 17 having a top cap 19 at its hood end and a base cap 20 at its base end, a mounting plate 21, and a stress relief element 23, which fills the space intermediate portions of the rigid insulator body 17 and portions of the end of the cable 13. The element 23 has a compressible portion 77 which is in the form of a stress control shield. Contiguous to this shield portion 77 is a high dielectric strength portion 79, which allows use of the element in a high voltage system, and this in turn is contiguous to another compressible portion 81. As is described in detail hereinafter, these portions are related to each other within the body of the element 23 such that in spite of the high dielectric portion, the compressible portions cause a continuous compliance of the entire element 23 to the end of the cable it surrounds. Such compliance eliminates the occurrence of interfacial voids, which could lead to dielectric breakdown, and is maintained even when the cable expands and contracts with temperature changes. At the same time, the element provides the terminator with an ability to accommodate cables having a range of diameters.

The high voltage power cable 13 includes a conductor 25, dielectric insulation 27 surrounding and encasing the conductor 25, a shield layer 29 surrounding the dielectric insulation 27, and concentric neutral or ground wires 31 wound around and in contact with the shield layer 29. The cable 13 may be prepared for receiving the terminator 15 by being stripped to expose a length of the bare metal conductor 25 at the end of the cable. The shield layer 29 is removed from around a length of the dielectric insulation 27. The ground wires 31 are removed from a portion of the end of the shield layer 29 and are bound to form a common ground wire 32 for subsequent connection to the mounting plate 21. This leaves an exposed length of the shield 29 intermediate the binding of the ground wires 31 and the exposed dielectric insulation 27. A lubricant, such as a silicone grease, is applied to the cable insulation and the shield. A protective plastic guide cap 33 is temporarily placed over the end of the cable conductor to protect internal components of the terminator 15 from being damaged by the metal conductor strand ends during assembly.

The terminator 15 is then slipped over the prepared cable end until the exposed conductor 25 extends beyond the terminator and the dielectric insulation 27 shoulders against the top cap 19 of the terminator. The protective guide cap 33 is then removed, its purpose having been fulfilled.

Referring now in more detail to the illustrated embodiment, porcelain is generally used for the rigid insulator body 17 because it is a self-cleaning, inorganic, homogeneous material which does not carbonize when subjected to leakage currents and is not subject to weathering, radiation, or chemical damage. Porcelain also has high tracking resistance, i.e., the ability of the material to resist the formation of a conductive path by an arc adjacent its surface. Additional materials, however, such as other ceramics, glass and epoxy resins, also may be suitable for this insulator body.

The top cap 19 and the base cap 20 may be made of metal, such as stainless steel, and both are firmly applied to the insulator body 17 as by rolling their edges over the ends of the body, as indicated by the reference numeral 35. Intermediate the ends of the insulator body and each of the caps is a gasket 37 of a suitable elastomeric material. The top cap 19 has a clearance opening 38 for receiving the conductor 25, and the base cap 20 has a clearance opening surrounded by an annular lip 39. These clearance holes preferably will pass the largest cable in the diameter range of cables a given terminator 15 is to accommodate, examples of which are provided hereinafter.

Physical support of the cable at the point of termination is provided by the mounting plate 21, which is secured to the base cap 20 by suitable means, such as threaded studs 40 and complementary nuts 41. The ground wire 32 may be connected on any of these studs. Holes 42 are provided in the mounting plate 21 for use in attaching the termination by suitable means to a separate supporting structure (not shown).

The stress relief element 23 is disposed within the rigid insulator body 17 such that its internal diametral surface is in direct contact with portions of the prepared cable end when mounted thereon. As is described in detail hereinafter, there is sufficient pressure at the interface of these surfaces to form a seal against the entrance of atmospheric conditions at the base end of the terminator 15.

Turning now to FIG. 2, at the top cap 19, or hood end of the terminator 15, a protective seal is formed by a sealing gasket 43 partially embedded in a gasket groove 45 in the base of an attachable sealable connector, such as a hood lug 47. The illustrated hood lug 47 is a specially modified so-called aerial lug useful in joining the conductor 25 to electrical apparatus or bus or to another cable. The sealable hood lug is attachable to the terminator 15 by means of threaded studs 49 suitably affixed to the top cap 19 (FIG. 1). In FIG. 2a, three mounting slots 50 are shown in the base of the hood lug 47. These slots receive the studs 49 for mounting the hood lug to the top cap 19 of the terminator. The lug is capable of accepting a range of cable sizes, both internally and externally, and the slots provide a self-centering feature which is useful in accommodating the cables on which the terminator may be applied. Generally, the cables for the external connection are consistent in size with those of the terminator.

When the hood lug 47 is securely mounted on the top cap 19, such as by nuts 51 on the threaded studs 49, the sealing gasket 43 forms a seal between the surfaces of the base of the lug 47 and the top cap 19. A bore 53 in the lug receives the bared conductor 25, which may be stranded. In the illustrated lug 47, suitable threaded openings 54 are in communication with the bore 53 and receive set screws 55 to form a compression fit of the conductor 25 in the bore 53 of the lug. The screws 55 are turned inwardly against the strands of the conductor to somewhat spread the strands and cause them to be compressed against and conform to the inner walls of the bore 53. Although three set screws 55 are illustrated, it is understood that the invention is not intended to be limited by a specific number of set screws. There could be more or less. The compression fit feature allows the illustrated lug 47 to replace the crimp type lug and a crimping tool therefor typically used for this type connection. Thus, this lug contributes to simplifying the field installation of the terminator.

As may be seen in FIG. 2b, the set screws are self-sealing, preferably as by a suitable plastic coating 58 on their threaded surfaces to seal out the environmental elements from the strands of the conductor 25. An annular tapered surface or countersink 60 (FIG. 2a) is provided at the outer end of each of the threaded openings to ease the entrance of the coated set screw 55 therein so that the coating 58 will not be peeled off by a sharp starting thread of the opening. Alternatively, the plastic coating could be applied on the threads of the opening. The bore 53 is completely closed except for the cable entrance in the base and the three set screw openings.

Since the applied set screws seal their openings, the gasket 43 seals the interface of the base of the lug 47 and the top cap 19, and the gasket 37 seals the interface of the top cap 19 and the body 17, the environmental elements are prevented from entering the terminator 15 from the hood end. As stated previously, the base end of the terminator is sealed by the stress relief element 23. Thus, the dielectric insulation 27 and the bared conductor 25 are completely contained within the terminator in a manner that makes them impervious to external influences.

The illustrated hood lug 47 is preferably a casting, such as an aluminum casting. A protuberant part of the casting is in the form of a clamp base 48. In the clamp base is a surface 62, which is in the form of a half cylinder whose axis is parallel to the general axis of the terminator 15, and a surface 64, which also is in the form of a half cylinder but whose axis is transverse to the general axis of the terminator 15. The radii of the two semicylindrical surfaces may be the same. The purpose of these surfaces is to establish an external electrical connection by receiving a suitable conductor from external circuitry or equipment, such as a transformer lead (not shown). Either surface (62 or 64) may be used as is convenient under the circumstances surrounding the connection, i.e., straight on with the terminator or at right angles to it.

The external electrical connection is completed by drawing up securely against the external conductor a cooperating clamp 48a by suitable means, such as four mounting bolts 52 in suitable threaded holes in the base 48. The clamp 48a has two semicylindrical surfaces 66 and 68 at right angles to each other in one of its mounting faces, and it has two semicylindrical surfaces 71 and 73 at right angles to each other in the other of its mounting faces. The four mounting bolts 52 are disposed at the four corners of a square. Thus, any of the surfaces 66, 68, 71 or 73 of the clamp 48a may be made to align with and oppose either of the surfaces 62 or 64 in the base 48. In the illustrated embodiment, the surfaces 66, 68, 71, 73 differ from one another in radius, thus providing combinations of cooperating surfaces to accommodate various sizes of a conductor. Alternatively, such combinations could be produced by surfaces of different radii in the base cooperating with one or more surfaces in the clamp.

This structure of the hood lug 47 provides an important feature of the present embodiment. Not only is the lug capable of internally accepting and sealing therein a range in size of cables by the sealable set screws 55 providing a compression fit on a conductor in the bore 53, but also the lug is capable of electrically joining thereto, without additional parts, external conductors that may be consistent in size to the internal cables. Further, other aerial lugs having a like base but a different cable size range are interchangeable on the top cap 19.

As shown in FIG. 2, the outside surface 56 of the rigid insulator body 17 is finned or corrugated in a conventional manner to increase the creepage distance along the surface between the top cap 19 (one hundred percent potential) and the base cap 20 (zero potential). The inner surface of the rigid insulator body 17 is smooth and includes a surface 57 formed by a general axial bore through the body and a surface 59 formed by a counterbore. The counterbore is of a larger diameter than the general bore and contains the stress relief element 23.

The stress relief element 23 is in the general form of a cylinder. The outer surface 61 of the element 23 is essentially equal to the diameter of the inner surface 59 in the base end of the insulator body 17 and thus conforms to and contacts this inner surface when the stress relief element is installed in the insulator body. The element 23 has a general axial bore through it which forms a general inner surface 63. It is noted that when the element 23 is installed in the body 17, the inner surfaces 57 of the body and 63 of the cone are axially aligned, but the diameter of the inner surface 63 is less than the diameter of the inner surface 57.

Returning now to FIG. 1, it is the general inner surface 63 of the stress relief element 23 that is in contact with a portion of the dielectric insulation 27 of the cable 13. A counterbore extends axially part way into the stress relief element 23 at its base end to form an inner surface 65, which is axially aligned with, but of a larger diameter than, the general inner surface 63 of the stress relief element. A chamfer 67 adjoins the inner surface 65 to facilitate assembly of the terminator. The inner surface 63 surrounds an end portion of the shield layer 29, which terminates at 69. This terminal 69 is at the end of a taper 70 made at the end of the shield 29 to bring about a more uniform wall thickness around the insulation at this point. This is especially important where the shield 29 is applied to the cable by extrusion and may not be of a completely uniform thickness around the circumference of the cable.

It will be noted that the disposition of the stress relief element 23 within the insulator body 17 and the disposition of the complete terminator 15 on the prepared end of the cable 13 are such that the offset between the inner surfaces 63 and 65 of the element 23 abuts the terminal 69 of the shield 29. The diameter of the annular inner surface 63 is slightly less than the diameter of the shield layer, and this forms a close fitting, intimate contact between the two surfaces. Such contact excludes air, moisture and other ambient elements. As is described in detail hereinafter, this is also an electrical contact that participates in the dielectric stress relief in the cable insulation adjacent the terminal 69 of the shield.

The above described disposition of the inner surface 65 of the stress relief element 23 cooperates with the earlier mentioned cable preparation in which the cable may be stripped or otherwise initially prepared to expose lengths of the conductor 25, the dielectric insulation 27, and the shield layer 29. These lengths are a function of the creep strength of the total termination and the voltage of the system on which it is employed. An example of one specific construction of the preferred embodiment has been built for a system of approximately 35 kv, in which the termination utilized substantially the following approximate dimensions: length of the terminator 15 less the hood lug 47, 14 inches; length of the bared conductor 25, 3¾ inches; length of the bared dielectric insulation 27, 12 inches; length of the bared shield layer 29, 5 inches; and length of the stress relief element 23, 7 inches.

Figure 3:
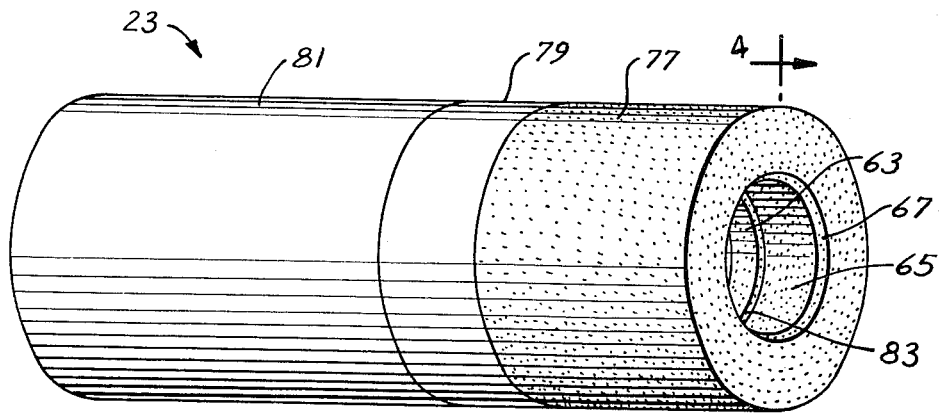
FIG. 3 is a perspective view of a stress relief element for use in the structures of FIGS. 1 and 2.
Figure 4:
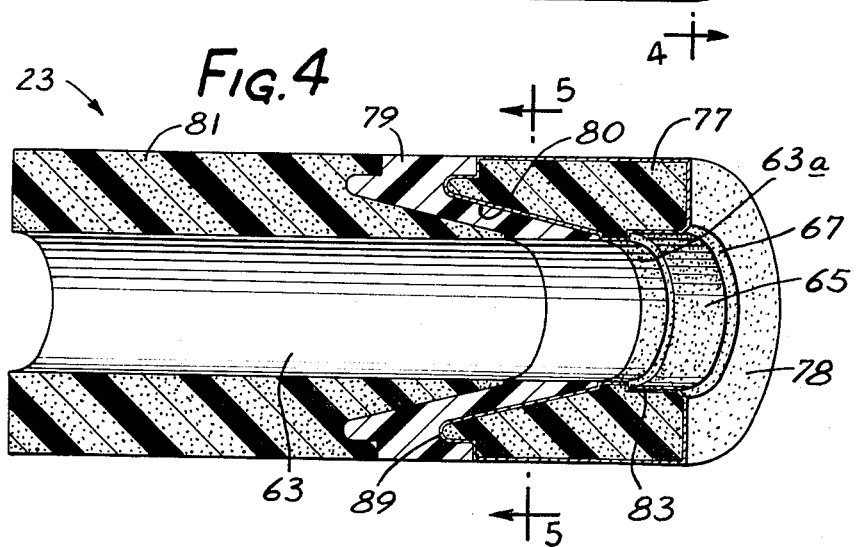
FIG. 4 is a sectional view in perspective taken along the line 4—4 of the element of FIG. 3.
Figure 5:
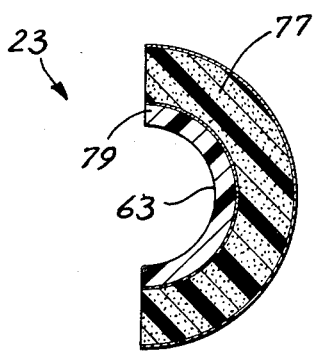
FIG. 5 is a sectional view taken along the line 5—5 of FIG. 4.

Having observed the details of the disposition of the stress relief element 23 in its interposed relation between at least portions of the rigid body insulator 17 and the prepared end of the cable 13, attention may now be given to the structure of the element 23 itself, the specific relation of the element to other parts of the cable termination, and the attendant advantages of both. The element 23 may be an assembled structural composite of separate portions having defined characteristics, or it may be formed in a continuous unit with a less abrupt change between the portions of defined characteristics. For purposes of illustration, the assembled composite is shown and described and is best seen in FIGS. 3–5. It is understood, however, that the invention is not limited to this composite construction.

Turning first to FIGS. 3 and 4, the illustrated stress relief element 23 is seen to be of cylindrical form and to comprise three portions or sections. A first or base portion 77 is that portion of the composite element 23 which when installed within the rigid insulator body 17 (FIG. 1) is near the base cap 20 of the terminator 15. This base portion 77 preferably is made of a closed-cell sponge elastomer, described in detail hereinafter, and has an inner surface 63a, which is in line with the general inner surface 63 of the completed element 23, and a tapered surface 80 adjoining the surface 63a. The taper of the surface 80 is directed outwardly from the axis of the element 23 and away from its base end, as best seen in FIG. 4. The tapered surface 80 forms a cavity having a shape closely resembling that of a truncated cone. Extending inwardly in the base portion 77 from its base end is the counterbore having the surface 65 and terminating at a shoulder 83. The chamfer 67 is at the leading edge of this counterbore.

All inner and outer surfaces of the base portion 77 are caused to be electrically conductive in a suitable manner, such as by covering the surfaces with a layer 78 of a conductive coating substance. Such conductive surfaces cause the base to be a stress control shield. One suitable substance for forming the conductive coating is manufactured by General Electric Company and is identified as General Electric Semi-Conducting Silicone Resin SR 531. An alternative is to make the entire base portion 77 conductive by insertion of electrically conductive carbon particles within the walls of the sponge material.

Another part of the composite element 23 is a second portion 79. This second portion has an outer surface at its base end of a shape that complements and interfits with the cavity in the base portion 77 when the two are axially aligned. This second portion preferably is made of a closed-cell elastomer of a higher density with a smaller average cell size than that of the base portion 77 to provide higher dielectric strength in the zone of the element occupied by this second portion. The dielectric strength of the body material constituting the aforementioned first portion 77 is relatively unimportant in view of its conductive surface. Absent the conductive surface, however, the sponge material does have an inherent dielectric strength, and this second portion 79 when compared therewith is, of course, of higher dielectric strength. The higher density and smaller average cell size of this portion gives it a nature approaching that of solid material. Alternatively, the material may be a solid elastomer. This second portion has an angular or generally frustoconical form, at least at its base end, and preferably has a tapering cavity in its other end for receiving yet another part of the cone. This other part, or third portion 81 of the composite element 23, has an outer surface at its base end that is shaped to complement and interfit with the cavity of the second portion 79 when the two portions are axially aligned. This portion 81 may be of the same closed-cell sponge elastomer as the base portion 77, but it is not made electrically conductive. Its density is lower (larger cell size) than that of section 79 providing a graded density stress element system, the higher density zones for the higher voltage gradient areas, as will be described in more detail hereinafter. The third portion 81 completes the general cylindrical form of the element.

The composite element 23 may be completed by assembling the unit portions axially in their interfitting relation and bonding the sections together with a suitable bonding agent. Alternatively, the cone 23 could be continuously molded in one piece with the aforementioned members of the cone being zones of defined characteristics.

It is noted that in the composite element 23 there is selective positioning of the density distribution of the materials within the body of the element. FIG. 5 illustrates a section taken arbitrarily through the second portion 79. According to the illustrated embodiment, the distribution of the solid material is within a zone of the element 23 that surrounds especially a critical high electric stress region 82 (FIG. 1) of the cable insulation 27 adjacent the end 69 of the cable shield 29. This distribution is such that any plane passing through the cylindrical element normal to the axis of the element and particularly within the region 82 will not pass through solid material only. There is sponge material adjacent the higher density material that any such plane would intersect. It will be noted that the relative disposition within the element of particularly the first two portions is such that the parts of the high dielectric portion intersected by the plane passing through the high stress region 82 are disposed inwardly of the compressible portion and surround the region, whereas the parts of the compressible portion intersected by the plane are disposed outwardly of the high dielectric portion and, as seen in FIG. 1, are in contact with the rigid insulator body 17. This structural combination provides an important advantage of combining the dielectric properties of the higher density material in this zone of the element with the mechanically compressible characteristic of cellular material, and this achieves continuous compliance of the element 23 to the vable to eliminate voids at the interface between the inner diametral surface of the element and the cable which could lead to dielectric breakdown, particularly in the region 82 of high electrical stress. This compliance is achieved even though solid, high dielectric strength material is incorporated in the body of the element 23, and it is achieved in a manner described below.

Figure 6:
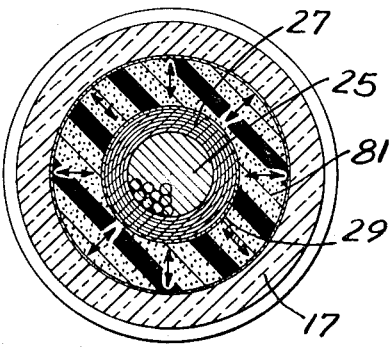
FIG. 6 is a sectional view of the termination taken along the line 6—6 of FIG. 1 and illustrating various features of the present invention.

The outer diameter of the composite stress relief element 23 is essentially the same as the inner diameter of the counterbore of the rigid insulator body 17 (FIG. 1) so that the inner surface 59 of the insulator body and the outer surface 61 of the composite element are in contact with each other when the assembled terminator 15 is slipped in telescopic relation over the prepared end of the cable 13. Because the insulator body 17 is rigid, it confines the composite stress relief element 23 and holds it under radial compressive stress when the element is interposed between the insulator body and the cable, as illustrated in FIG. 6. The arrows depict the direction of both the initial and reactive forces, i.e., radially outwardly to the rigid body 17 and radially inwardly to the cable. These forces react in the same manner on all surfaces of the exposed portions of the prepared cable end that are surrounded by the composite stress relief element 23 and the rigid insulator body 17. In the zone of the element 23 surrounding particularly the region 82 of high electrical stress of the cable, these radial forces, like the aforementioned plane, intersect parts of both the high dielectric strength portion 79 and the compressible portion 77 of the element, and the compressible portion assures the continuous compliance of this zone of the element to the cable without objectionable sized voids.

Figure 7:
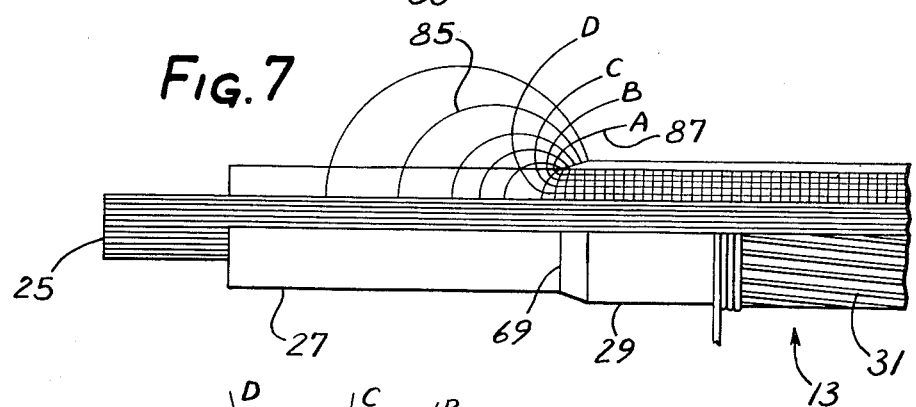
FIG. 7 is a diagrammatic view of a cable end illustrating the intensity pattern of a typical electric field in a high voltage cable at the end of the cable shield.
Figure 8:
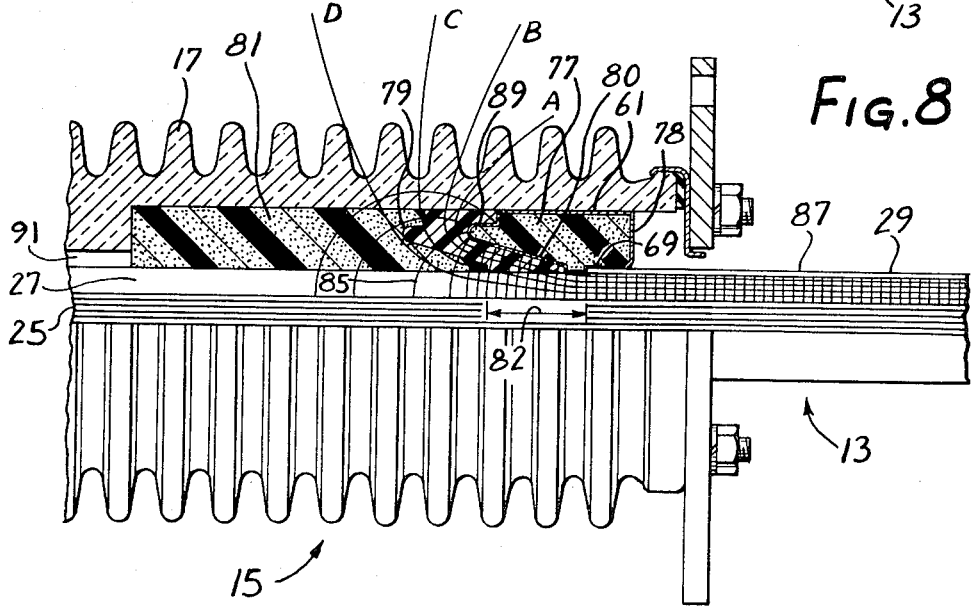
FIG. 8 is a diagrammatic view of a portion of the termination of FIG. 1 depicting some effects of the illustrated embodiment on the electric field pattern of FIG. 7.

The effect of disposing the conductive portion 77 of the stress relief element 23 in gripping contact with the end 69 and adjacent portion of the conductive shield 29 is best seen in a comparison between FIGS. 7 and 8. Referring first to FIG. 7, typically the dielectrical stress conditions adjacent the end of the shield 29 are extremely severe when compared to those within the run of the cable 13 under the shield layer 29. For example, electrostatic flux lines 85 are radial within the run of the cable 13, and equipotential lines 87 are parallel within the run of the cable where surrounded by the shield 29. Beyond the end 69 of the conductive shield, however, the flux lines 85 converge into a dense concentration at 69, the result of which is high electrical stress in a small area; and the equipotential lines 87 deflect out and around to emerge from the cable insulation 27 relatively close together, the result of which is a region of high voltage longitudinal gradients at this point in the insulation. In this regard, note particularly sample equipotential lines A, B, C, and D and let A represent one-eighth full voltage, B represent one-quarter full voltage, C represent one-half full voltage, and D represent three-quarters full voltage. It is seen that most of the voltage is impressed across a very short length of the cable insulation layer 27 longitudinally adjacent the end 69 of the conductive shield 29. Such high longitudinal electrical stress in a small area may cause insulation failure. It is such a region represented at 82 in FIG. 1.

Now referring to FIG. 8, the advantageous application of the illustrated embodiment of the terminator 15 with the inner stress element 23 is illustrated. The base portion 77 of the element, which has the conductive coating 78 therearound, surrounds the end portion of the shield 29 in a gripping relation. The conductive coating 78 is grounded through its intimate association with the cable shield 29, which is grounded by the ground wires 31 (FIG. 1). As this base or stress control shield portion of the stress cone tapers outwardly from the insulation layer 27 of the cable, the electric field expands, as noted by the flux lines 85, and the voltage gradients do not concentrate longitudinally, as noted by the gradual bending outwardly of the equipotential lines A, B, C, and D along the tapered surface 80 in the region 82 of high electric stress.

The tapered surface 80 terminates in a rounded tip 89 before reaching the general outer surface 61 of the stress relief element. This structural feature of the cone shield termination reduces at this area the intensity of voltage gradients that otherwise would occur in a manner similar to that depicted by lines A and B of FIG. 7. Whatever electrical stress is built up in this area of stress control shield termination is contained without rupture by the high dielectric strength portion 79 immediately adjacent this portion 77.

It will be noted that the stress relief element 23 does not fill the space between the cable insulation 27 and the insulator body 17 along the entire length inside the insulator body. There is a space 91 (FIGS. 1 and 8) adjacent the inner surface 57 of the body. Entrapped air is not excluded from this space since the electric field (FIG. 8) follows generally outwardly under the stress cone shield or base portion 77 and only passes through the space 91 at relatively low voltage gradients which do not cause dielectric breakdown of the air. Further, the ambient elements are effectively prevented from entering this space because of the seals at both ends of the terminator 15. Thus, any part of the cable adjacent the space 91 is adequately protected without filling this space with a dielectric medium. This cavity could, of course, be filled with suitable dielectric sponge if so desired.

As a result of the foregoing combination structure of insulator body and inner stress relief element, the illustrated terminator 15 decreases the intensity or concentration of the flux lines 85 and the equipotential lines 87 in the high electric stress region 82 of the high voltage cable 13, thereby increasing the voltage at which a given power cable may be used in a system.

The closed-cell elastomeric sponge material that is used for the preformed inner stress relief element 23 in the preferred embodiment is both compressible and compliable. The method of producing the element 23 may utilize molding in a manner well known in the art. During the production of the element, voids, i.e., the result of material contamination or process irregularities, are prevented from occurring, and the size and distribution of the gas cells are selected and controlled to obtain desired electrical and mechanical properties. Thus, the closed cells, rather than being voids, are purposely formed under controlled process conditions. This cellular structure in a suitable elastomer in accordance with the present invention provides a stress relief element that is capable of withstanding operational or contingency stresses, whether electrical, thermal, or physical, that are typical in a dielectric system.

Suitable elastomers for the illustrated stress relief element 23 include silicones, ethylene-propylene, fluorosilicones, and fluorinated elastomeric copolymers. An example of a fluorinated copolymer is Viton, a trademark of E. I. duPont de Nemours & Company.

A satisfactory cellular structure for the base portion 77 of the stress relief element 23 when made of silicone rubber is a density of 0.022 pounds per cubic inch with a maximum cell diameter of from 0.15 millimeters to 0.75 millimeters. This same material and cellular structure, as mentioned previously, may also be used for the third portion 81 of the stress relief element when such third portion is employed. A satisfactory cellular structure for the second, or high dielectric, portion 79 of the stress relief element 23 when made of silicone rubber is a density of 0.044 pounds per cubic inch with a maximum cell diameter of from 0.07 millimeters to 0.09 millimeters.

In the foregoing material description, it will be noted that both material density and cell size are variables. For the second portion, the preferred material is of smaller average cell size than that of the first portion and the density is greater. Dielectric strength is increased in a closed-cell elastomer as the cell size is decreased, since the dielectric strength of a gas filled space is an inverse function of the diameter of the cell. Accordingly, if the elastomer is a solid material, the dielectric strength is even higher. In such high dielectric strength material, however, the physical or mechanical properties of compressibility and compliability are substantially diminished.

The preferred embodiment, as indicated previously, employs a combination of sponge material and essentially solid material in a continuous axially aligned relationship that utilizes the advantages of both types of material. The selective density distribution along the interface, i.e., along the tapered surface 80 between the first or base portion 77 and the second portion 79, provides the present embodiment with a zone of high dielectric insulation immediately adjacent the stress control shield, or base portion 77, and this high insulation zone is in surrounding relation to the critical high electric stress region 82 of the prepared cable end when the terminator 15 is applied to the cable.

At the same time, the sponge material of the base portion is outwardly adjacent the solid material in the zone of the element surrounding the critical region 82 of the cable and provides compressibility in this zone.

This structure of the stress relief element 23 in combination with its relation to the rigid body 17 in the present embodiment of the terminator 15 produces many advantages over known terminators. Among these advantages are the capability of the terminator of maintaining a uniform, relatively constant, radial pressure at the interface of the stress relief element and the prepared cable end, especially in the region of high electrical stress of the cable, so as to effect a proper seal and good electrical contact in this region without voids on cables of differing diameters, and there is no need for the addition of a high dielectric fluid or compound in the present structure, simplifying the field installation of the terminator.

Further, the present structure of the element 23 causes it to yield when the cable expands and to follow when the cable contracts. During both instances, the present element 23 complies with the generally cylindrical surface of the portion of the cable which it surrounds, thus assuring contact at the interface even if the general cylindrical surface is slightly out of form. During these volumetric changes of the cable, the radial compressive forces resulting from the present structural combination maintain the relatively constant pressure at the interface sufficient to effect the aforementioned seal and electrical contact. Yet the pressure is low enough to avoid excessive plastic deformation (cold flow) of the cable dielectric insulation during periods of high temperature when the cable expansion is the greatest and the resistance of the insulation to plastic deformation is the least. Thus, the terminator is capable of operating effectively at temperatures higher than the typical temperatures of previously known terminators.

As mentioned previously, the present structural combination provides the terminator 15 with the capability of accommodating cables of differing diameters within a range of cable sizes. For example, in a 35 kv system, five sizes of the illustrated terminator 15 will accommodate power cables ranging in size from 1/0 AWG to 1,000 MCM. More specifically, each size will accomodate appropriately a 0.150 inch range of cable diameter. For each cable size accommodated, the above noted uniform radial pressure at the interface is effected. Further, this uniform radial pressure is maintained under anticipated ambient conditions regardless of the current conducting state of the high voltage system on which the cable is employed.

The present stress relief element 23 as described herein has relaxation and creep modulii that are sufficient to compensate for the tendency of the typical elastomer to relax and to lose some gas from its cells, where cells are present, and to provide an ability to effectively function in not only establishing a tight interface between the inner diametral surface of the element on cables of differing diameters, but also to maintain such during use.

Further, the element 23 as described has corona cutting resistance, ozone resistance, and low moisture and gas permeability. The closed gas cells provide high ionization inception and extinction levels and resist deleterious effects of ionization even during periods of over stress, such as occurs during lightning and abnormal switching surges. The ozone resistance is important around the typical high voltage electrical systems wherein appreciable amount of ozone may be generated around exposed high voltage electrodes. The low moisture and gas permeability are important where excessive absorption of moisture or a high rate of cell gas loss would adversely affect the ionization inception and extinction levels associated with the gas space of the cells. An additional structural feature assists in minimizing moisture absorption. This feature is the relatively low exposed surface to volume ratio of the structure of the element 23. In this connection, note the exposed base end 93 of the element 23 in FIG. 1.

Summarising the advantages of the structure of the present stress relief element 23 and its interposed relation between the rigid insulator body 17 and a cable 13 prepared end, the present element: (a) has the ability to accommodate slightly out-of-shape cylindrical forms, such as the bared insulation of high voltage cables; (b) accomodates a diametral range of these cables; (c) maintains sufficient radial pressure to effectively form a seal and a good electrical contact at the interface of the element and the cables under both (a) and (b) even during volumetric changes of the cables as they respond to temperature excursions; (d) provides (a), (b) and (c) while preventing excessive internal pressures from developing during periods of high thermal conditions that could over stress the cable and cause plastic deformation of the insulation; and (e) provides (d) and yet dos not allow inadequate pressure or space to develop at the interface of the element and the cable whereby the effective seal against atmospheric elements and the electrical contact between parts would diminish or be lost entirely.

Summarizing the advantages provided by the combination structure of the illustrated embodiment in the cable termination 11, including the foregoing stress relief element 23, the present terminator 15 (a) encloses the cable end in an envelope having moisture resistant characteristics, (b) provides means to alleviate increase in electrical stresses on the cable insulation caused by the interruption of the cable shield, (c) provides means in the form of a sealable compression lug for an external electrical connection to the terminator with conductors having current carrying capacity consistent with the cable conductor characteristics of the termination, (d) provides means for physical support of the cable, (e) is effective for use on a range of cable sizes, and (f) is easily and quickly field installed without the separate use of special dielectric compounds or fluids or hood lug crimping tools.

Although the present invention is susceptable to various modifications and alternative constructions, only a preferred embodiment has been shown in the drawings and described in detail. Such disclosure is not intended to limit the invention. The aim is to cover all modifications and alternative constructions falling within the spirit and scope of the invention as expressed in the appended claims.

Various features of the invention are set forth in the following claims.

What is claimed is:

1. A terminator for use with a prepared end of a power cable having an exposed end of a shield layer and an exposed dielectric insulation portion, a part of said exposed dielectric insulation portion adjacent said exposed end of the shield being a region of high electrical stress, said terminator comprising a rigid insulator body having an axial passageway therethrough for application in telescopic relation over said prepared end of said cable and an inner stress relief element for interposition between said insulator body and said prepared end of said cable, said element including a first portion comprising a compressible elastomer and having electrically conductive properties, said first portion forming a stress control shield for electrical engagement with said shield layer of said cable, and a second portion contiguous to said first portion along an interface between said portions for fitting in surrounding relation and in radial compressive stress over said region of said prepared cable end, said second portion having higher dielectric strength than said first portion and comprising a less compressible elastomer than that of said first portion, said second portion providing dielectric insulation adjacent said first portion, said interface between said first and second portions being directed such that the radial forces in the zone of said element surrounding said region of said prepared cable end intersect parts adjacent one another of both said first and said second portions, such intersected parts of said second portion being disposed inwardly of those of said first portion and in surrounding relation to said region to provide dielectric insulation in surrounding engagement with said region, and such intersected parts of said first portion being outwardly adjacent those of said second portion and providing compressibility in the zone of said element surrounding said region for continuous compliance of said element to said cable, said first and second portions of said element being under radial compressive stress relative to the axis of said cable when said rigid insulator body is applied to said prepared cable end and said element is interposed therebetween.

2. The terminator in accordance with claim 1, wherein said compressible elastomer of said first portion of said element is of closed-cell sponge material and said elastomer of said second portion of said element is a closed-cell elastomer having a density that is greater than the density of the elastomer of said first portion.

3. The terminator in accordance with claim 1, wherein said compressible elastomer of said first portion of said element is of closed-cell sponge material and said elastomer of said second portion of said element is a closed-cell elastomer having cells the average size of which is smaller than the average size of the cells of the elastomer of said firs portion.

4. The terminator in accordance with claim 1, wherein said compressible elastomer of said first portion of said element is of closed-cell sponge material and said elastomer of said second portion of said element is a solid elastomer.

5. The terminator in accordance with claim 1, wherein said first and second portions of said element are distinct and wherein said element further includes a third distinct portion axially aligned in tandem with respect to said other portions and comprising a compressible elastomer, the three portions forming a composite unit, said composite unit having a generally cylindrical outer surface and an axial bore extending therethrough, the diameter of said bore when the unit is in an uncompressed state being less than the diameter of said exposed dielectric insulation of said cable, and the outer diameter of said composite unit being essentially equal to the diameter of at least a portion of said axial passageway in said rigid insulator body, whereby said composite unit is placed under radial compressive stress relative to the axis of said cable when said terminator is applied in telescopic relation to said prepared end of said cable and said composite unit is interposed therebetween.

6. The terminator in accordance with claim 5, wherein; said first portion comprises an opening extending axially therethrough, said first portion opening including a part of said axial bore and a cavity adjoining and axially aligned therewith and increasing outwardly and away therefrom; said second portion comprises a generally frustoconical form, one end of which has an outer surface of a shape complementary to said first portion cavity to interfit therewith, and an opening extending axially therethrough, said second portion opening including a part of said axial bore and a cavity adjoining and axially aligned therewith and increasing outwardly and away therefrom; and said third portion comprises one end having an outer surface of a shape complementary to said second portion cavity to interfit therewith, and a part of said axial bore therein.

7. The terminator in accordance with claim 6, wherein said cavities of said first and second portions terminate their wide ends in an arcuate form and at points inwardly of said generally cylindrical outer surface of said composite unit.

8. The terminator in accordance with claim 6, wherein said first portion further comprises an axial counterbore extending inwardly from the non-cavity end thereof, said counterbore having a diameter greater than that of said axial bore and less than that of said exposed end of said cable shield.

9. The terminator in accordance with claim 1, wherein said electrically conductive properties of said firs portion comprise a conductive coating applied to all surfaces thereof, including the surfaces at said interface between said first and second portions.

10. The terminator in accordance with claim 1, wherein said electrically conductive properties of said first portion comprise the insertion of electrically conductive particles throughout the elastomer of said first portion.

11. The terminator in accordance with claim 1, wherein said interface between said first and second portions tapers relative to the cable axis.

12. The terminator in accordance with claim 1, further comprising a sealable compression type electrical connector for making an external electrical connection to said terminator, said connector being disposed at one end of said insulator body and comprising a sealable internal chamber for receiving the stranded conductor of said cable and means for forming said external electrical connection.

13. The terminator in accordance with claim 12, wherein said sealable compression connector further comprises a threaded opening communicating with said chamber, a set screw disposed within said threaded opening for turning inwardly against the strands of said cable conductor to compress the strands against the inner walls of said chamber, and a coating of sealant disposed between the threads of said set screw and said opening.

14. The terminator in accordance with claim 13, wherein said means for forming said external electrical connection comprises a base on said connector, said base having at least a first semicylindrical surface disposed therein for receiving an external conductor; a clamp releasably attached to said base for tightening against said external conductor, said clamp having at least a first semicylindrical surface disposed therein; and at least a second semicylindrical surface on either said base or said clamp, said second semicylindrical surface having a radius different from either of said first semicylindrical surfaces to provide combinations of cooperating opposing semicylindrical surfaces for accommodating various sizes of said external conductor.

15. A sealable compression type electrical connector comprising a sealable internal chamber for receiving the stranded conductor of a power cable, means for forming an external connection to said conductor, a plurality of threaded openings disposed closely adjacent one another in alignment along the axis of said chamber and in communication therewith, a corresponding plurality of headless set screws disposed within said threaded openings for turning inwardly against the strands of said conductor to compress the strands against the inner walls of said chamber, and a coating of sealant disposed between the threads of each of said set screws and said openings.

16. The connector in accordance with claim 15, wherein said means for forming an external electrical connection comprises a base on said connector, said base having at least a first semicylindrical surface disposed therein for receiving an external conductor; a clamp releasably attached to said base for tightening against said external conductor, said clamp having at least a first semicylindrical surface disposed therein; and at least a second semicylindrical surface on either said base or said clamp, said second semicylindrical surface having a radius different from either of said first semicylindrical surfaces to provide a combination of cooperating opposing semicylindrical surfaces for accommodating various sizes of said external conductor.

17. A stress relief element having a generally cylindrical form with an axial bore therethrough and comprising: a first portion comprising a compressible elastomer and having electrically conductive properties, said first portion forming a stress control shield; and a second portion in axial alignment with said first portion and contiguous thereto along a tapering interface between said portions, said interface extending outwardly and away from the first portion end of said element, and said second portion having higher dielectric strength than said first portion and comprising a less compressible elastomer than the elastomer of said first portion, said second portion providing dielectric insulation adjacent said first portion.

18. The stress relief element in accordance with claim 17, wherein said compressible elastomer of said first portion of said element is of closed-cell sponge material and said elastomer of said second portion of said element is a closed-cell elastomer having a density that is greater than the density of the elastomer of said first portion.

19. The stress relief element in accordance with claim 17, wherein said compressible elastomer of said first portion of said element is of closed-cell sponge material and said elastomer of said second portion of said element is a closed-cell elastomer having cells the average size of which is smaller than the average size of the cells of the elastomer of said first portion.

20. The stress relief element in accordance with claim 17, wherein said compressible elastomer of said first portion of said element is of closed-cell sponge material and said elastomer of said second portion of said element is a solid elastomer.

21. The stress relief element in accordance with claim 17, wherein said first and second portions of said element are distinct and wherein said element further includes a third distinct portion axially aligned in tandem with respect to said other portions and comprising a compressible elastomer, the three portions forming a composite unit, said composite unit having a generally cylindrical outer surface and an axial passageway extending therethrough.

* * * * *

UNITED STATES PATENT OFFICE
CERTIFICATE OF CORRECTION

Patent No. 3,796,821  Dated March 12, 1974

Inventor(s) George E. Lusk

It is certified that error appears in the above-identified patent and that said Letters Patent are hereby corrected as shown below:

Column 1, line 13, "terminator" should be in quotes.

Column 2, line 19, "wet" should be in quotes.

line 57, "dry" should be in quotes.

Column 3, line 7, "dry" should be in quotes.

Column 9, line 31, "vable" should read -- cable --.

Column 10, line 20, "It is seen" should read -- It is then seen--

Column 14, line 54, "firs" should read -- first --.

Column 15, line 40, "firs" should read -- first --.

Signed and sealed this 16th day of July 1974.

(SEAL)
Attest:

McCOY M. GIBSON, JR.
Attesting Officer

C. MARSHALL DANN
Commissioner of Patents